Jan. 26, 1971   H. C. FISCHER ET AL   3,557,408
APPARATUS FOR MOLDING REINFORCED ARTICLES
Filed May 20, 1968   3 Sheets-Sheet 1

United States Patent Office 3,557,408
Patented Jan. 26, 1971

3,557,408
APPARATUS FOR MOLDING REINFORCED ARTICLES
Herbert Corliss Fischer and Herbert Corliss Fischer, Jr., both of 3 Sawyer Road, Wellesley, Mass. 02181
Filed May 20, 1968, Ser. No. 730,382
Int. Cl. B29d 3/00
U.S. Cl. 18—36                                                    7 Claims

ABSTRACT OF THE DISCLOSURE

Molding articles with a preformed peripheral reinforcing band. The mold comprises a reinforcing band guard shoulder serving to protect the reinforcing band from edge-directed pressure during the molding process.

---

This invention relates to molding peripherally reinforced articles.

One exampel of the articles adapted to be molded by the techniques of the present invention are concave or cup-shaped grinding wheels. It has been recognized that a peripheral reinforcing band secured to the external surface of such a wheel can provide a substantial increase in the resistance of the wheel to centrifugal force and a resulting increase in the maximum speed at which the wheel may be used safely. Wheels have been produced by first molding and curing the body of the wheel and then mounting one or more reinforcing bands to the wheel periphery. However, such production processes are both slow and expensive and have the further disadvantage of frequently resulting in damaged or rejected wheels owing to the fragility of the wheel body prior to curing The present invention avoids these problems and produces substantial production economies by permitting an article to be molded within a preformed reinforcing band.

Heat-cured grinding wheels are typically molded by filling a mold cavity with a composition containing abrasive grains intermingled with a bonding agent, compacting the composition within the cavity, carefully removing the uncured wheel from the mold and then transferring it into an oven or kiln and heat curing it for a period of many hours. The finished product's strength and safety in use depend upon even filling of the mold cavity and upon proper pressure distribution throughout the mold cavity during the compacting operation. Yet even if the filling and compacting operations are performed perfectly, the resulting uncured wheel is still quite fragile, having handling properties similar to those of a green sand foundry mold. The wheel does not attain its full strength until the heat curing operation is completed. Consequently, great care is required to remove the uncured wheel from the mold without damage. To prevent slumping during the baking, the uncured wheels are packed in sand prior to being loaded into the oven or kiln. Even with the most careful handling, damage may still occur, resulting, if undetected, in hazardous latent defects which could cause death or serious injury to an operator should the wheel break up during rotation.

If the uncured wheel can be continuously encased in and protected by a preformed reinforcing band until the curing operation is completed, the risk of accidental damage to the uncured wheel is greatly reduced. Furthermore, if the reinforcing band is high tensile strength, the hazard of break-up under operating conditions could be eliminated, or, at the least, greatly reduced even in the relatively unlikely event that an undetected flaw should occur prior to completion of the curing operation.

Though preformed reinforcing bands may have great tensile strength, they have little resistance to crushing when subjected to edge-directed compressive forces such as are typically encountered during the compacting portion of the molding operation. Therefore, although efforts have been made to mold various forms of reinforcement into the wheel interior, peripheral reinforcing bands heretofore have not been integrally molded, but rather have been attached to the wheel periphery after molding and curing by winding.

Accordingly, it is a principal object of the present invention to mold articles with a preformed peripheral reinforcing band in place without damaging the band during the compacting operation. Other objects include providing a relatively inexpensive preformed reinforcing band of high tensile strength, improving the evenness of the mold cavity fill and properly controlling the distribution of pressure throughout the mold cavity during the compacting operation, reducing the number of articles damaged in the process of removing the articles from the mold and transferring them to the oven or kiln, and reducing the time and labor required for the entire production cycle while yet improving the safety and quality of the finished articles.

In a preferred embodiment of the invention, there is featured a generally cup-shaped mold band which preferably may be provided with an upwardly movable bottomplate, an insert ring concentric with the mold band and extending radially slightly inward thereof, a pressure plate concentric with and radially inward of the insert ring, and a central spring loaded core radially inward of the pressure plate.

The wheel reinforcing band is first placed in the mold band. The insert ring is then placed upon the upper surface of the mold band. Next the core is installed in the center of the mold cavity. With the core in place, the mold cavity is charged with the composition to be molded. Finally, the pressure plate is inserted between the outer surface of the core and the inner surface of the insert ring.

A press piston is brought down upon the upper surface of the pressure plate. A first portion of the compression stroke forces the pressure plate down to a point where its upper surface is flush with the supper surface of the core. This first portion of the stroke drives the outer portions of the composition inward partially compacting the contents of the mold cavity. A second portion of the compression stroke then forces both the pressure plate and the core downward upon the composition, and if such be provided, may also force the movable bottom plate upward against the composition, further compacting the composition in the mold cavity. At the completion of the compression stroke the press piston is retracted, and the insert ring and pressure plate are removed. The uncured wheel with its protecting reinforcing band is removed from the mold band and transferred to the oven or kiln for heat curing. To prevent unwanted upward expansion of the wheel during the baking, a weight may be placed on the upper surface of the wheel.

Other objects, features, and advantages will appear from the following description of a preferred embodiment of the invention taken together with the attached drawings thereof in which.

Figure 1:
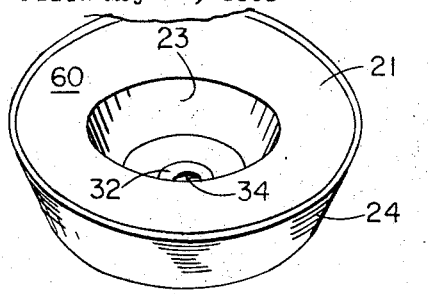
FIG. 1 is a perspective view of a cup-shaped grinding wheel constructed in accord with the present invention taken in the direction of the working surface thereof.
Figure 2:
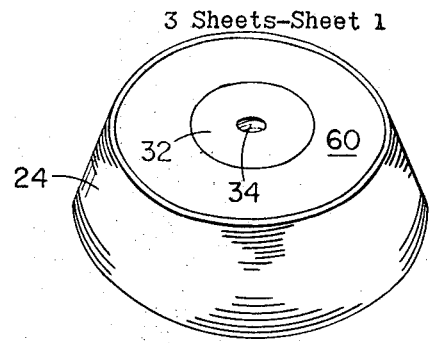
FIG. 2 is another view of the same grinding wheel taken in the direction of the opposite surface.

Referring more particularly to the drawings, there is shown in FIG. 1 and FIG. 2 one typical example of an article such as may be efficiently produced in accord with the invention, a cup-shaped grinding wheel. The molded body of the wheel 60 is partially bounded by an annular working surface 21, and a frusto-conical inner surface 23. The wheel is provided with a peripheral reinforcing band 24 and a wheel face-plate bushing 32, which has a threaded central hole 34 for attaching the wheel to a grinder shaft.

Figure 3:
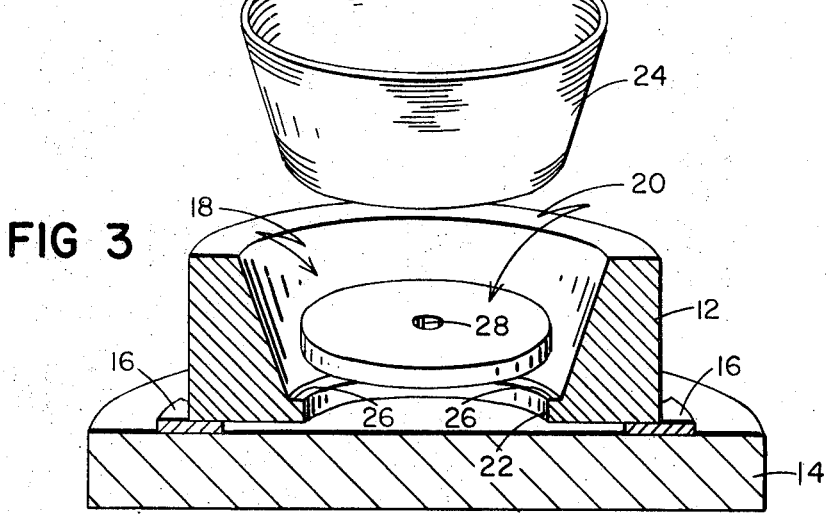
FIG. 3 is an assembly drawing partially in section showing the wheel reinforcing band and the bottom plate in position to be inserted into the mold band.

There is shown in FIG. 3 a mold band 12 (spaced from a press table 14 by shims 16), defining a frusto-conical mold cavity 18 preferably provided with a movable central bottom plate 20 sized to fit slidably within aperture 22 and bored with a central hole 28. (Alternatively, the bottom of the mold cavity may be integral with the mold band 12 in which case the shims 16 are not required.) Bottom plate 20 is placed within aperture 22 to rest upon press table 14 as shown in FIG. 4.

Reinforcing band 24 is then inserted in mold cavity 18 with its lower edge resting on shoulder 26. The reinforcing band may be formed from fiber glass (or synthetic fiber) rovings, filaments, or tape. This form of preformed reinforcing band is relatively inexpensive, yet possesses very high tensile strength. For wheels that are subject to less stress and thus require no permanent peripheral reinforcement, a ring of paper tape (which may but need not be adhesive-coated) has been used advantageously as a temporary reinforcing band. If the tape is adhesive-coated, the adhesive side of the tape forms the inner surface of the reinforcing band and adheres to the wheel body. The ring of paper tape provides sufficient strength to permit the uncured wheel to be removed from the mold and moved to the oven or kiln with reduced risk of accidental damage without packing in sand.

When a high tensile strength, resilient reinforcing band is used, preferably the outer diameters of the reinforcing band are very slightly smaller than the corresponding inner diameters of mold cavity 18. This difference in diameter permits the reinforcing band to be tightly filled and slightly prestressed by the introduction and compression of the molding composition into the mold cavity and thus ensures that the reinforcing band firmly grips the finished wheel body.

Figure 4:
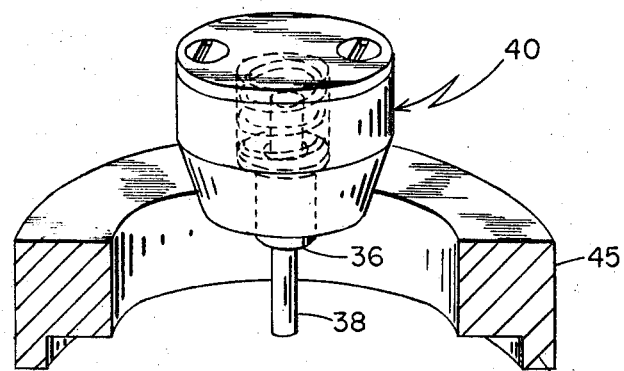
FIG. 4 is another sectional assembly drawing showing the wheel face-plate bushing, core post, core, and insert ring in position to be assembled to the mold band.
Figure 4:
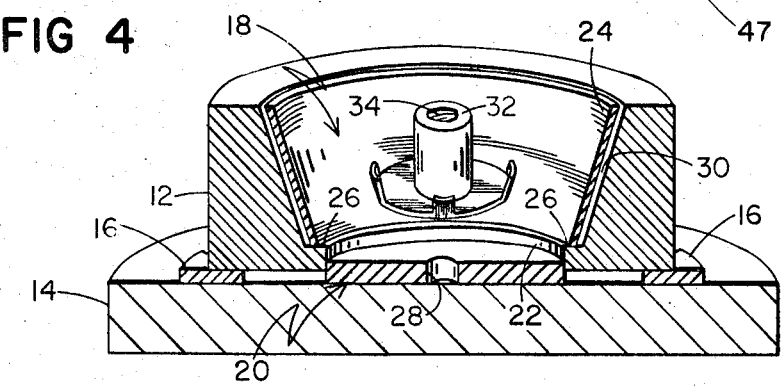

In FIG. 4, both the reinforcing band 24 and the bottom plate 20 are shown in place in mold band 12. The upper surface of the bottom plate is recessed below shoulder 26 by a distance equal to the thickness of shims 16. This distance is selected in accordance with the required density at the bottom of the wheel and provides an equivalent upward compression stroke of the bottom plate when the shims 16 are subsequently removed and the mold band 12 is forced down upon the press table 14.

Reinforcing band 24 rests on shoulder 26 and because of the difference between its outer diameters and the corresponding inner diameters of mold cavity 18 the reinforcing band is spaced from the inner wall of the mold band to define a space 30 (shown somewhat exaggerated in the figures for clarity). Only when the reinforcing band 24 is of resilient construction is a difference in diameters appropriate. (If an inelastic reinforcing band is used, the band must fit the mold cavity 18 exactly and no space 30 is employed).

Wheel face-plate bushing 32 is then centered on the bottom of the mold cavity over hold 28 and support post 36 of core 40 is installed at the center of the mold cavity by inserting pin 38 through threaded hole 34 into hole 28. Insert ring 45 is next placed over the mold band 12, being centered by ridge 47 (see FIG. 5). The inner radius of the insert ring is less than the uppermost inner radius of the mold band by an amount slightly greater than the thickness of the reinforcing band plus the width of space 30. This difference in radius defines an inwardly extending overhanging guard shoulder 52 to protect the upper edge of the reinforcing band from edge-directed pressure during the subsequent compacting operation. In all cases, guard shoulder 52 should be wide enough to extend inwardly at least to the innermost point of the upper edge of reinforcing band 24. After core 40 and insert ring 45 are in place, mold cavity 18 is charged with composition 50 (see FIG. 5.)

Figure 5:
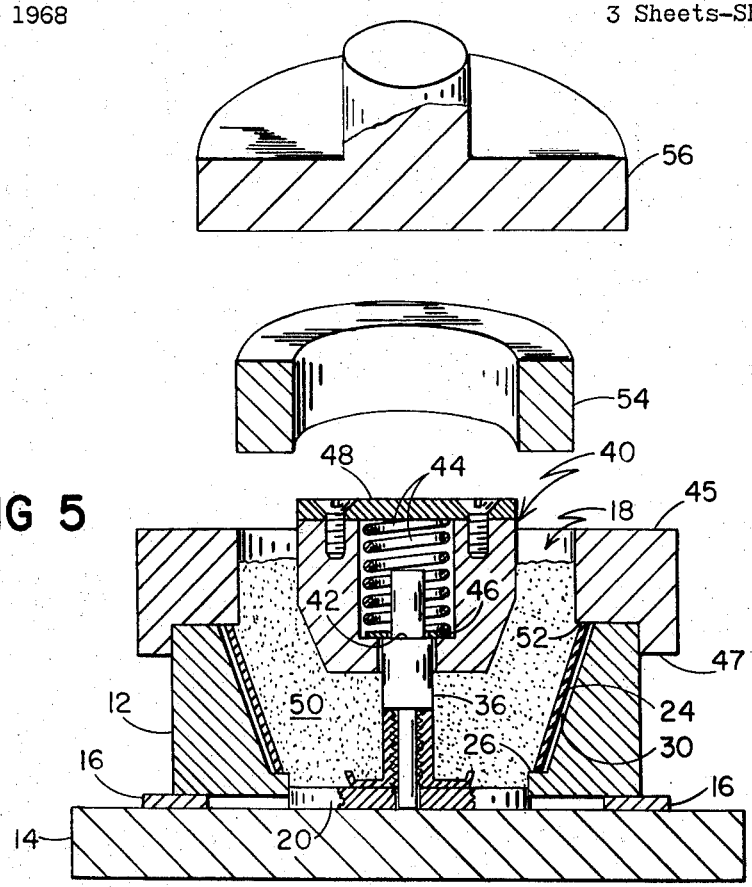
FIG. 5 shows the pressure plate beneath a press piston in position to be inserted between the core and the insert ring.
Figure 6:
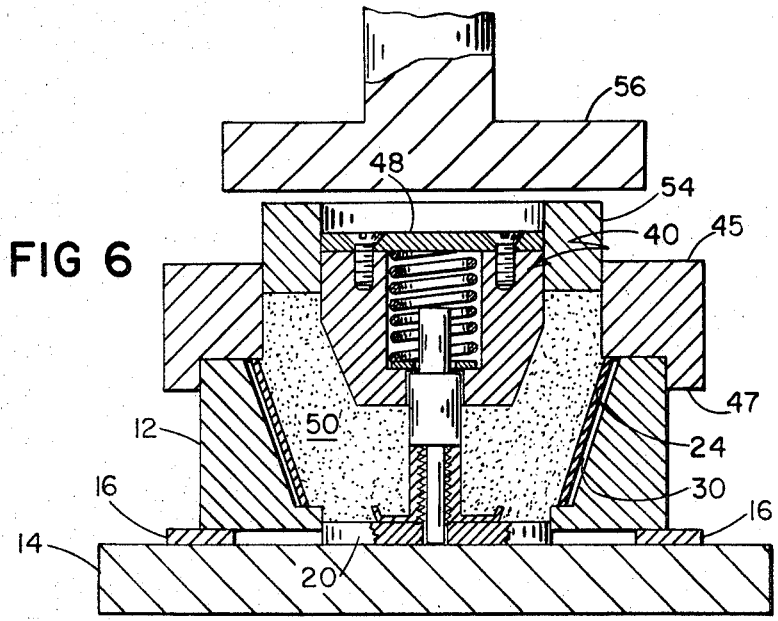
FIG. 6 shows the mold assembled and ready for the compression stroke of the press piston.

The internal structure of the core element 40 is detailed in FIG. 5. Core return spring 44 rests on washer 46 which in turn rests on shoulder 42. The upper end of spring 44 presses against cap plate 48 thus holding the core in the raised position shown in FIG. 5 through FIG. 7 prior to the compression stroke and returning the core to that position when the press piston is retracted after the completion of the compression stroke.

Figure 7:
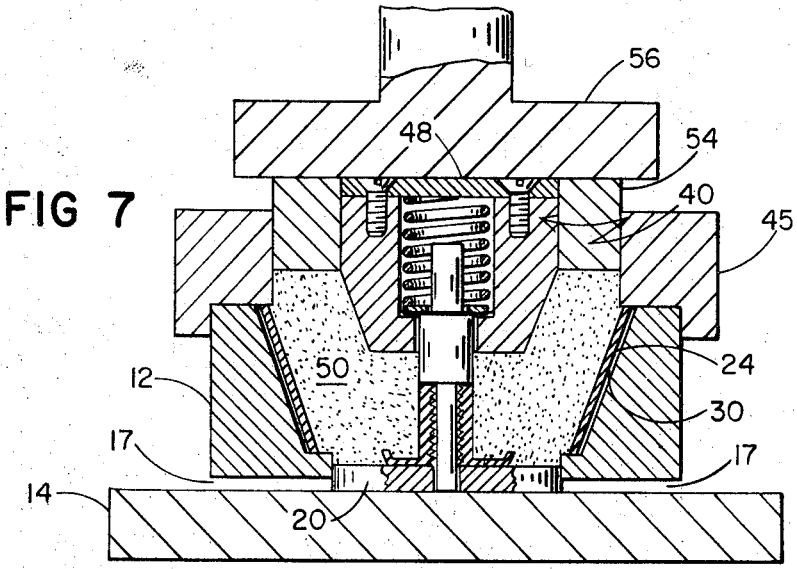
FIG. 7 shows the completion of the first portion of the compression stroke.

After composition 50 is poured into the mold, it must be uniformly distributed in the mold and leveled. Pressure plate 54 (shown beneath press piston 56 in FIG. 5) is then inserted in mold cavity 18 between insert ring 45 and core 40. The pressure plate is shown in place in FIG. 6. The mold is then ready for the compression stroke of press piston 56. Completion of the first portion of the compression stroke is shown in FIG. 7. Pressure plate 54 serves as a leading annular piston head which drives the outer portions of composition 50 inward, partially compacting the contents of the mold cavity. This first portion of the compression stroke can also cause reinforcing band 24 to be somewhat distended, narrowing space 30 (in the figures, this space is exaggerated to show this effect more clearly). At the completion of the first portion of the compression stroke, the top surface of pressure plate 54 is flush with the top surface of core plate 48 (see FIG. 7).

After the first portion of the compression stroke is completed, shims 16 (if used) are removed, leaving shim gap 17 between mold ring 12 and press table 14 (see FIG. 7). The mold is then ready for the second portion of the compression stroke. Press piston 56 exerts great downward force (typically as much as 30 tons) on pressure plate 54 and core 40. Mold band 12 is forced downward onto press table 14 producing the upward compression stroke of bottom plate 20 (if used) and eliminating shim gap 17. Downward motion of core 40 and pressure plate 54 can cooperate with the upward motion of bottom plate 20 to produce a predetermined distribution of pressure (and hence density) throughout the mold. If the bottom plate is not used, core 40 and pressure plate 54 alone provide the compacting force.

Figure 8:
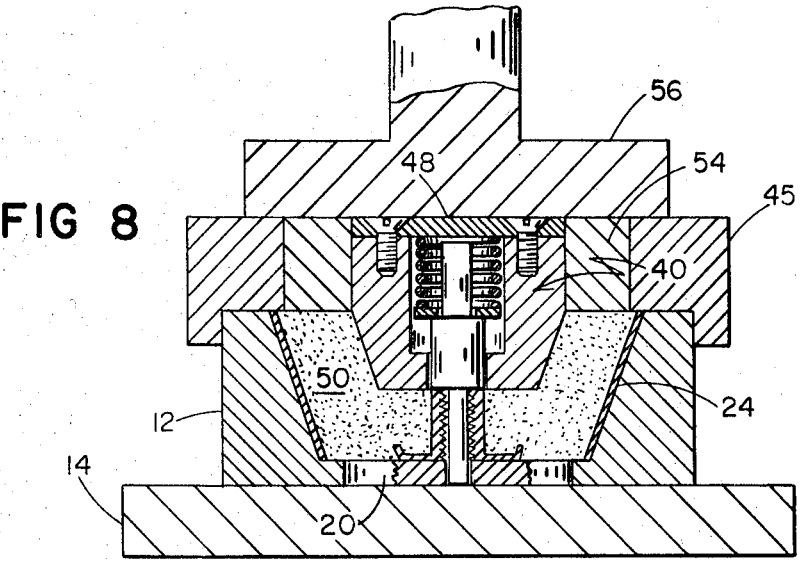
FIG. 8 shows the completion of the second portion of the compression stroke.

Completion of the second portion of the compression stroke is shown in FIG. 8. The top surface of pressure plate 54 has descended to approximately the same level as the top of reinforcing band 24, thus defining the top surface of the molded wheel. Mold band 12 is resting on table 14. Reinforcing band 24 is fully distended, eliminating space 30.

To remove the article from the mold, press piston 56 is first retracted, then insert ring 45 is lifted off mold band 12, next pressure plate 54 is removed, and finally, the mold band 12 is covered with a flat pallet and carefully inverted to release the uncured wheel body with reinforcing band 24 gripping and protecting it. The wheel body and its encasing reinforcing band are then packed in sand and transferred to the oven or kiln for heat curing.

Other embodiments within the scope of the following claims will occur to those skilled in the art.

We claim:

1. Apparatus for molding articles with preformed peripheral reinforcing bands comprising a mold defining a mold cavity with a bottom surface and peripheral side surfaces said side surfaces and said bottom surface conforming generally to the outer surface and lower edge of a preformed reinforcing band said mold comprising a reinforcing band guard shoulder defining an annular surface extending radially inward of said peripheral side surfaces a distance no less than the thickness of the upper edge of said preformed reinforcing band said annular surface conforming generally to the upper edge of said preformed reinforcing band and serving to protect said upper edge from edge-directed pressure a pressure member mounted for movement into said mold cavity to reduce the effective volume thereof and thereby to compact a molding composition introduced therein, said pressure member comprising an inner pressure surface, an outer pressure surface concentric with said inner pressure surface, and a press for successively moving said outer pressure surface a first distance into said mold cavity whereby a molding composition introduced therein is partially compacted and then moving said outer pressure surface and said inner pressure surface a second distance into said mold cavity whereby the contents of said mold cavity are further compacted to a pretermined density distribution 2. The apparatus of claim 1 wherein said annular surface is defined by a removable insert ring.

3. The apparatus of claim 1 wherein said peripheral side surfaces are spaced from the outer surface of said preformed reinforcing band prior to the filling of said mold cavity and said reinforcing band is distended by the filling of said mold cavity to engage said peripheral side surfaces.

4. The apparatus of claim 1 wherein said mold cavity is frusto-conical.

5. The apparatus of claim 1 further comprising return means for returning at least one of said pressure surfaces to its initial position subsequent to the use of said press.

6. The apparatus of claim 1 further comprising at least one opposing pressure surface mounted for relative movement into said mold cavity in a direction generally opposite to the direction of motion of said inner pressure surface and said outer pressure surface.

7. The apparatus of claim 1 wherein said press is movable from a first position to a second position and from said second position to a third position and in said first position said press is positioned to engage the upper surface of an annular pressure plate the lower surface of said annular pressure plate defining said outer pressure surface the outer mediate surface of said pressure plate being slidably mounted within said peripheral side surfaces of said mold cavity and being concentric with and radially inward of said reinforcing band guard shoulder said first and said second position being so spaced that in moving from said first position to said second position said press advances said annular pressure plate said first distance into said mold cavity in said second position said press is positioned to further engage the upper surface of a core slidably mounted within said pressure plate the lower surface of said core defining said inner pressure surface said second and said third position being so spaced that in moving from said second position to said third position said press advances said annular pressure plate and said core said second distance into said mold cavity.

References Cited

UNITED STATES PATENTS

| | | | |
|---|---|---|---|
| 2,101,015 | 12/1937 | Anderson | 18—34 |
| 2,158,044 | 5/1939 | Haller | 18—34X |
| 2,407,123 | 9/1946 | Allison | 18—16 |
| 3,059,278 | 10/1962 | Daniel | 18—34 |
| 3,189,942 | 6/1965 | Rapprich et al. | 18—16 |
| 3,247,301 | 4/1966 | Praeg et al. | 18—36X |
| 3,405,214 | 10/1968 | Butts | 18—36X |

J. HOWARD FLINT, JR., Primary Examiner

U.S. Cl. X.R.

18—16, 34, ring dig; 264—267